US 6,688,761 B2

(12) United States Patent
Kondo et al.

(10) Patent No.: US 6,688,761 B2
(45) Date of Patent: Feb. 10, 2004

(54) VEHICLE HEADLAMP AUTOMATIC ADJUSTING DEVICE WITH SENSOR FAILURE DETECTION MEANS

(75) Inventors: Masanori Kondo, Nagoya (JP); Kunio Ohashi, Toyota (JP); Yuji Yamada, Okazaki (JP); Yoshiyuki Miki, Susono (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/985,933

(22) Filed: Nov. 6, 2001

(65) Prior Publication Data
US 2002/0057572 A1 May 16, 2002

(30) Foreign Application Priority Data
Nov. 10, 2000 (JP) ........................................ 2000-344194

(51) Int. Cl.[7] ................................................ B60Q 1/08
(52) U.S. Cl. .................... 362/466; 362/464; 362/465
(58) Field of Search ................................. 362/464, 465, 362/466, 459, 37, 43; 315/82, 76

(56) References Cited

U.S. PATENT DOCUMENTS 5,384,765 A * 1/1995 Sakagami et al. .......... 362/466
5,909,949 A * 6/1999 Gotoh ........................ 362/466
5,931,572 A * 8/1999 Gotoh ........................ 362/466
6,010,237 A * 1/2000 Gotou ........................ 362/465
6,109,759 A   8/2000 Tanabe et al.
6,254,259 B1 * 7/2001 Kobayashi .................. 362/465
6,302,553 B1 * 10/2001 Izawa ......................... 362/466
6,332,698 B1 * 12/2001 Toda et al. .................. 362/466
6,357,898 B1 * 3/2002 Toda et al. .................. 362/465
6,389,344 B1 * 5/2002 Nishimura et al. ......... 362/466

* cited by examiner

Primary Examiner—Alan Cariaso
Assistant Examiner—Ismael Negron
(74) Attorney, Agent, or Firm—Posz & Berthards, PLC

(57) ABSTRACT

Output of each sensor arrangement is supplied to an ECU through a communication bus line. A value of a turning radius of a vehicle, which is used for adjusting directions of optical axes of swivel lights, is computed based on the output of each sensor arrangement in the ECU. When a majority of the computed values fall within a predetermined allowable range, the majority of the computed values are determined as normal, and the remaining of the computed values is determined as abnormal. The communication bus line is determined as abnormal when none of the output from the sensor arrangements is obtained. An optical axis control angle is computed based on the normal computed values and is used to drive actuators to adjust directions of the optical axes of the swivel lights.

5 Claims, 4 Drawing Sheets

VEHICLE HEADLAMP AUTOMATIC ADJUSTING DEVICE WITH SENSOR FAILURE DETECTION MEANS

CROSS REFERENCE TO RELATED APPLICATION

This application is based on and incorporates herein by reference Japanese Patent Application No. 2000-344194 filed on Nov. 10, 2000.

BACKGROUND OF THE INVENTION

1. Field of the Invention

The present invention relates to an automatic optical-axis adjusting device for automatically adjusting directions of optical axes of front lights of a vehicle.

2. Description of Related Art

When the vehicle makes a turn, it is possible to adjust the directions of the optical axes of the front lights with respect to a turning direction or traveling direction of the vehicle to improve visibility of a driver. Various control parameters can be used for controlling the directions of the optical axes of the front lights. For example, in one previously proposed automatic optical-axis adjusting device for automatically adjusting the directions of the optical axes of the front lights, a turning radius of the vehicle is used as the control parameter. To provide a less erroneous turning radius of the vehicle, a computing means first computes a value of the turning radius based on each one of output information of a steering wheel sensor arrangement, output information of a vehicle wheel speed sensor arrangement that includes left and right vehicle wheel speed sensors, and output information of a yaw rate sensor arrangement. Next, the computed value of the turning radius derived from the output information of the steering wheel sensor arrangement, the computed value of the turning radius derived from the output information of the vehicle wheel speed sensor arrangement, and the computed value of the turning radius derived from the output information of the yaw rate sensor arrangement are averaged to obtain the less erroneous turning radius. Then, an optical axis control angle is computed based on this turning radius and is used to adjust the directions of the optical axes of the front lights. In such an instance, it is advantageous to transmit the output information from each sensor arrangement to the computing means through a communication bus line. The use of the communication bus line allows a reduction in the number of signal lines for connecting between the sensor arrangements and the computing means in the vehicle.

However, in the above automatic optical-axis adjusting device, if the output information of any one of the steering wheel sensor arrangement, the vehicle wheel speed sensor arrangement and the yaw rate sensor arrangement includes an erroneous value due to, for example, a failure of that sensor arrangement, the averaged turning radius, and hence the optical axis control angle, becomes erroneous.

Furthermore, if noises are present in the communication bus line, the information from each sensor arrangement may become abnormal, resulting in improper adjustment of the directions of the optical axes of the front lights.

SUMMARY OF THE INVENTION

The present invention addresses the above disadvantages. Thus, it is an objective of the present invention to provide an automatic optical-axis adjusting device for automatically adjusting a direction of an optical axis of each corresponding front light of a vehicle in a more reliable manner with use of a plurality of sensor arrangements.

To achieve the objective of the present invention, there is provided an automatic optical-axis adjusting device for automatically adjusting a direction of an optical axis of at least one front light of a vehicle. The automatic optical-axis adjusting device includes a control parameter computing means for computing a value of a control parameter, which is used for adjusting the direction of the optical axis of the at least one front light, based on output information of each one of a plurality of sensor arrangements. The automatic optical-axis adjusting device also includes a sensor output judging means for determining whether each value of the control parameter, which is derived from the output information of a corresponding one of the plurality of sensor arrangements, is normal. The sensor output judging means first determines whether a majority of the values fall within a predetermined allowable error range. If the majority of the values fall within the predetermined allowable error range, the sensor output judging means determines the majority of the values as normal and the remaining of the values as abnormal. The automatic optical-axis adjusting device further includes a control angle computing means for computing an optical axis control angle, which is used for adjusting the direction of the optical axis of the at least one front light, based on the output information of at least one sensor arrangement, from which the normal value of the control parameter is derived. The automatic optical-axis adjusting device also includes an optical axis adjusting means for adjusting the direction of the optical axis of the at least one front light based on the optical axis control angle by driving an actuator that turns the optical axis of the at least one front light.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
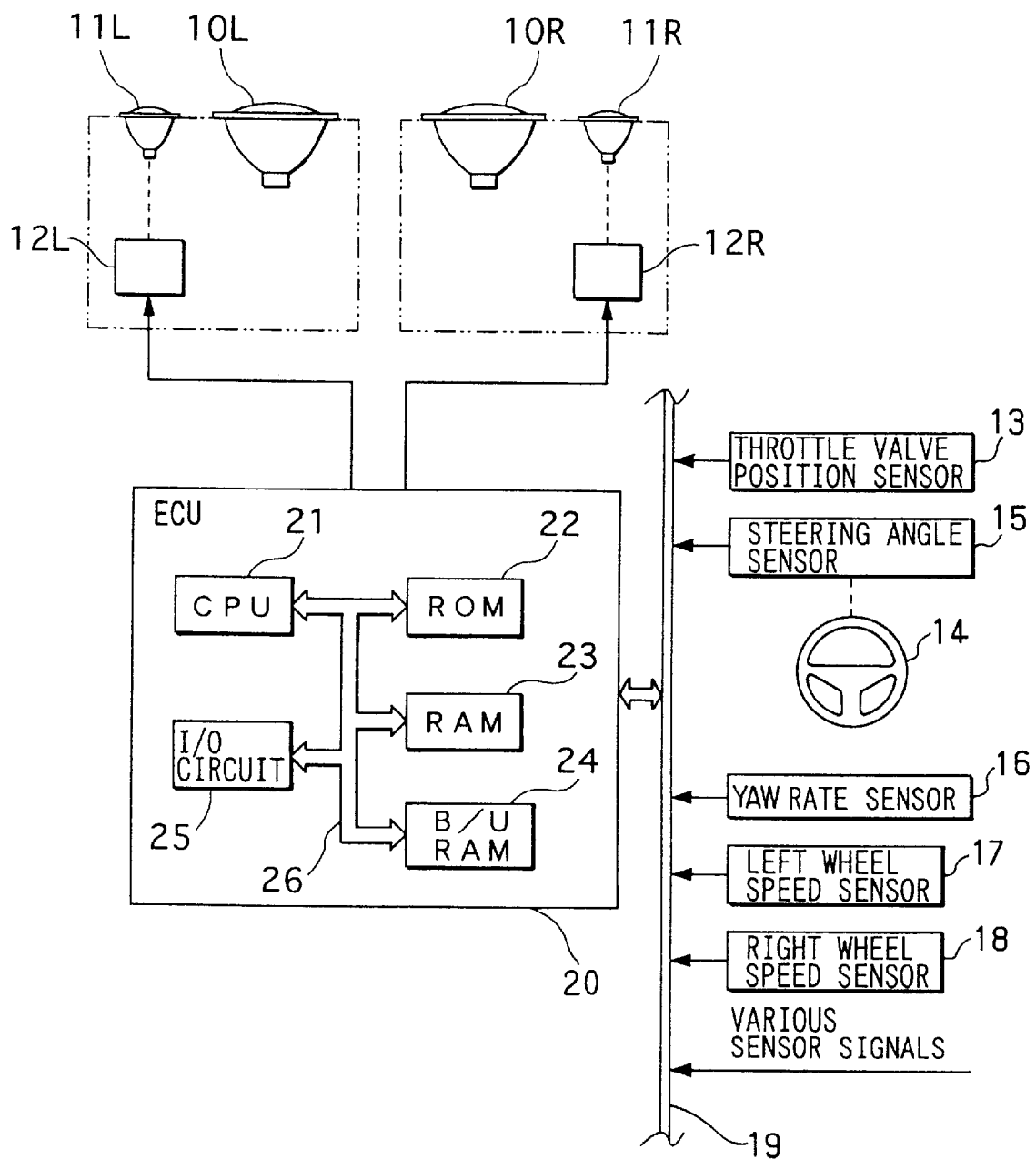
FIG. 1 is a schematic view showing an entire structure of an automatic optical-axis adjusting device for automatically adjusting directions of optical axes of front lights of a vehicle according to an embodiment of the present invention.

With reference to FIG. 1, left and right headlights 10L, 10R as well as left and right swivel lights 11L, 11R are arranged at a front of the vehicle as vehicle front lights. Optical axes of the swivel lights 11L, 11R can be turned horizontally in a left or right direction separately from or integrally with optical axes of the headlights 10L, 10R through a swivel control. A reference numeral 20 denotes an electronic control unit (ECU). The ECU 20 is formed as a logical operation circuit that includes a CPU 21, a ROM 22, a RAM 23, a backup (B/U) RAM 24, an input-output (I/O) circuit 25 and an internal bus line 26. The CPU 21 is a central processing unit that carries out various known arithmetic operations. The ROM 22 stores control programs. The RAM 23 stores various data. The internal bus line 26 interconnects the components of the ECU 20.

A throttle valve position signal of a throttle valve position sensor 13, a steering angle signal of a steering angle sensor (also referred to as a steering angle sensor arrangement) 15, a yaw rate signal of a yaw rate sensor (also referred to as a yaw rate sensor arrangement) 16, wheel speed signals of left and right vehicle wheel speed sensors (together constituting a vehicle wheel speed sensor arrangement of the present invention) 17, 18 and various other sensor signals are inputted to the ECU 20 through, for example, a communication bus line 19 acting as an external bus line that constitutes a car area network (CAN). The throttle valve position signal is used to determine whether the vehicle is in a running state or in a parking state (non-running state). The steering angle signal indicates a steering angle of a steering wheel 14 from a neutral point in the left or right direction. The yaw rate signal indicates a change rate of a vehicle turning angle about a vertical axis that extends through a center of gravity in the vehicle. The vehicle wheel speed signals of the left and right vehicle wheel speed sensors 17, 18 indicate vehicle wheel speeds of left and right vehicle wheels, respectively. Output signals from the ECU 20 are inputted to actuators 12L, 12R of the left and right swivel lights 11L, 11R. Optical axes of the left and right swivel lights 11L, 11R are adjusted based on the output signals from the ECU 20, as will be described in greater detail below.

Figure 2:
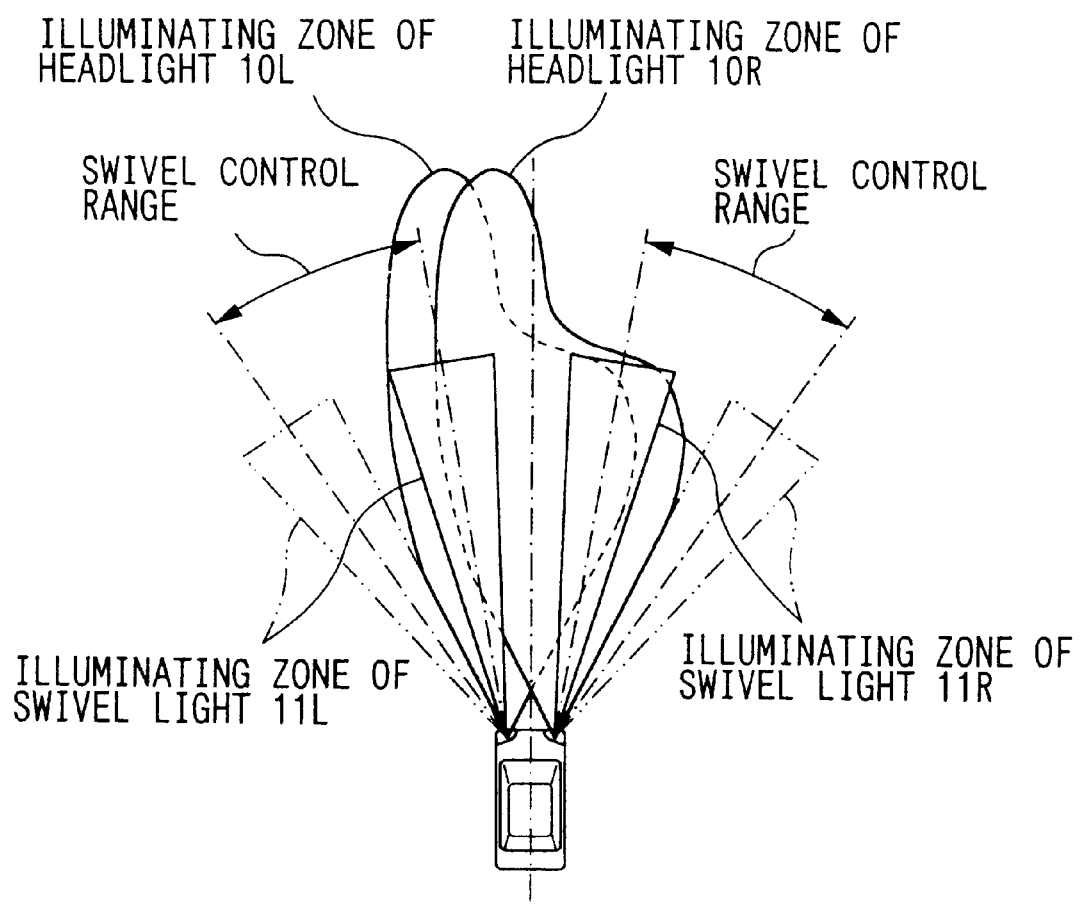
FIG. 2 is a schematic view showing illuminating zones of headlights and illuminating zones of swivel lights in the automatic optical-axis adjusting device according to the embodiment of the present invention.

In the present embodiment, as shown in FIG. 2, an illuminating zone (measured during the low beam state) of a light beam (left beam) emitted from the headlight 10L and an illuminating zone (measured during the low beam state) of a light beam (right beam) emitted from the headlight 10R are substantially immovable. On the other hand, illuminating zones of the swivel lights 11L, 11R can be adjusted within its swivel control range based on the steering angle signal of the steering angle sensor 15, the yaw rate signal of the yaw rate sensor 16, the wheel speed signals of the left and right vehicle wheel speed sensors 17, 18, and the like.

The present embodiment will now be described with reference to FIGS. 3 and 4, which indicate first and second parts of an abnormality specifying and optical axis adjusting operation carried out in the CPU 21 of the ECU 20, respectively. The abnormality specifying and optical axis adjusting operation is repeated in the CPU 21 at predetermined time intervals. Each abnormal flag described in greater detail below is initialized when an ignition switch (not shown) of the vehicle is turned on to start an internal combustion engine of the vehicle.

Figure 3:
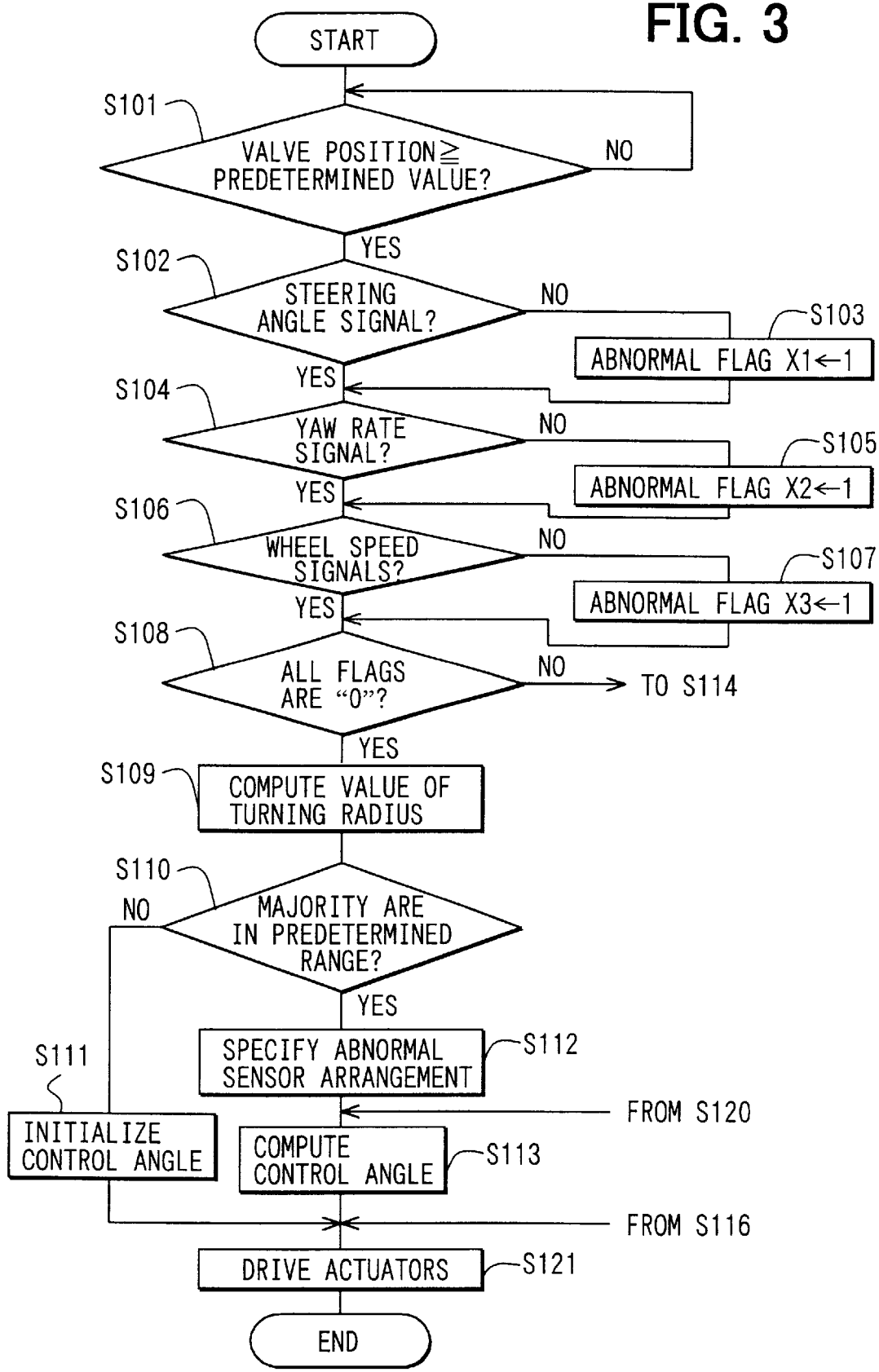
FIG. 3 is a flowchart depicting a first part of an abnormality specifying and optical axis adjusting operation carried out in a CPU of an ECU provided in the automatic optical-axis adjusting device according to the embodiment.

With reference to FIG. 3, at step S101, it is determined whether a throttle valve position of a throttle valve is equal to or greater than a predetermined value, i.e., whether the throttle valve is opened for an amount equal to or greater than a predetermined amount. If "NO" is returned at step S101, i.e., if the vehicle is in the parking state, and hence the throttle valve position is less than the predetermined value, step S101 is repeated until the throttle valve position becomes equal to or greater than the predetermined value. If "YES" is returned at step S101, i.e., if the throttle valve position is equal to or greater than the predetermined value, and hence the vehicle is in the running state, control moves to step S102.

At step S102, it is determined whether the steering angle signal from the steering angle sensor 15 is present. If "NO" is returned at step S102, i.e., if the steering angle signal is not present, control moves to step S103. At step S103, an abnormal flag X1 indicative of abnormality of the steering angle sensor 15 is set to "1", and then control moves to step S104. On the other hand, if "YES" is returned at step S102, i.e., if the steering angle signal from the steering angle sensor 15 is present, control skips step S103 and moves to step S104.

At step S104, it is determined whether the yaw rate signal from the yaw rate sensor 16 is present. If "NO" is returned at step S104, i.e., if the yaw rate signal is not present, control moves to step S105. At step S105, an abnormal flag X2 indicative of abnormality of the yaw rate sensor 16 is set to "1", and then control moves to step S106. On the other hand, if "YES" is returned at step S104, i.e., if the yaw rate signal from the yaw rate sensor 16 is present, control skips step S105 and moves to step S106.

At step S106, it is determined whether the left and right vehicle wheel speed signals from the left and right wheel speed sensors 17, 18 are present. In this instance, a turning radius of the vehicle is computed based on a difference between the vehicle wheel speed measured with the left wheel speed sensor 17 and the vehicle wheel speed measured with the right wheel speed sensor 18. Thus, only when the vehicle wheel speed signals from the left and right wheel speed sensors 17, 18 are both present, "YES" is returned at step S106. IF "NO" is returned at step S106, i.e., if the vehicle wheel speed signals are not present, control moves to step S107. At step S107, an abnormal flag X3 indicative of abnormality of the left and right vehicle wheel speed sensors 17, 18 is set to "1", and control moves to step S108. On the other hand, if "YES" is returned at step S106, i.e., if the vehicle wheel speed signals are present, control skips step S107 and moves to step S108.

At step S108, it is determined whether all the abnormal flags X1, X2, X3 are set to "0 (zero)". If "YES" is returned at step S108, i.e., if the steering angle signal, the yaw rate signal and the vehicle wheel speed signals are all present, control moves to step S109. At step S109, a value of the turning radius of the vehicle is computed through three different ways. First, a first value of the turning radius is computed based on the steering angle signal. Next, a second value of the turning radius is computed based on the yaw rate signal. Then, a third value of the turning radius is computed based on the vehicle wheel speed signals. Thereafter, control moves to step S110 where it is determined whether the turning radius can be determined from the first to third computed values by applying a majority rule to them. Here, if a majority of the first to third computed values fall within a predetermined allowable error range, it is determined that the turning radius can be obtained based on the majority of the computed values. In this embodiment, the computed values, which fall within the predetermined allowable error range, are regarded as the same value.

If "NO" is returned at step S110, i.e., if the turning radius of the vehicle cannot be determined from the first to third computed values by applying the majority rule to them, it is not possible to determine which sensor arrangement is abnormal. Thus, control moves to step S111 where an optical axis control angle (swivel control angle) is returned to its initial value. On the other hand, if "YES" is returned at step S110, i.e., if the turning radius of the vehicle can be determined from the first to third computed values by applying the majority rule to them, control moves to step S112. At step S112, one of the first to third values, which is determined to be a minority upon application of the majority rule, is determined as abnormal, and one of the sensor arrangements 15–18, from which the abnormal value is derived, is specified as abnormal. Then, control moves to step S113 where the optical axis control angle (swivel control angle) is computed based on the turning radius of the vehicle, which is derived from the normal computed values obtained by applying the majority rule to the first to third computed values.

Figure 4:
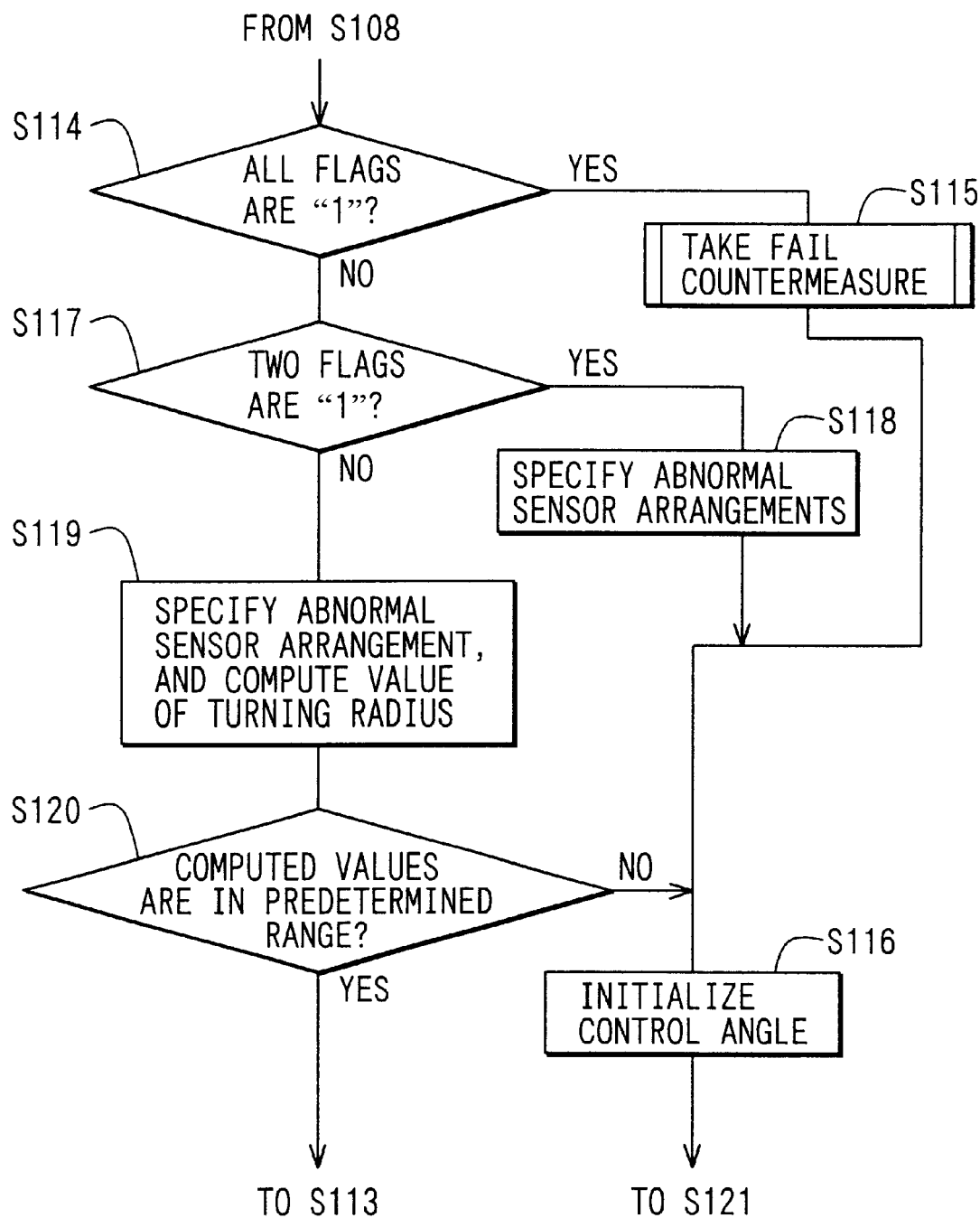
FIG. 4 is a flowchart depicting a second part of the abnormality specifying and optical axis adjusting operation.

If "NO" is returned at step S108, control moves to step S114 shown in FIG. 4. At step S114, it is determined whether all the abnormal flags X1, X2, X3 are set to "1". If "YES" is returned at step S114, i.e., the steering angle signal, the yaw rate signal, the vehicle wheel speed signals are all absent, control moves to step S115. At step S115, the communication bus line 19 is determined to be abnormal, and a fail countermeasure is taken. One exemplary fail countermeasure is illumination of a warning lamp provided in a meter panel. Then, control moves to step S116 where the optical axis control angle (swivel control angle) is set to its initial value.

If "NO" is returned at step S114, i.e., if all the abnormal flags X1, X2, X3 are not set to "1", control moves to step S117. At step S117, it is determined whether two of the abnormal flags X1, X2, X3 are set to "1". If "YES" is returned at step S117, control moves to step S118. At step S118, the two sensor arrangements that have its abnormal flag X1, X2, X3 set to "1" are specified as abnormal, and, for example, the warning lamp(s) provided in the meter panel is illuminated. Thereafter, control moves to the above-described step S116 where the optical axis control angle (swivel control angle) is set to its initial value.

If "NO" is returned at step S117, i.e., if only one of the abnormal flags X1, X2, X3 is set to "1", control moves to step S119. At step S119, the corresponding one sensor arrangement that has its abnormal flag X1, X2, X3 set to "1" is specified as abnormal, and a value of the turning radius is computed based on the output of each one of the remaining two sensor arrangements. Then, control moves to step S120 where it is determined whether the two computed values of the vehicle turning radius obtained at step S119 fall within the predetermined allowable error range. If "YES" is returned at step S120, it is determined that the signals from the remaining two sensor arrangements are reliable. Then, control moves to the above-described step S113 shown in FIG. 3 where the optical axis control angle (swivel angle) is computed in the manner discussed above.

If "NO" is returned at step S120, i.e., if the two computed values of the turning radius obtained at step S119 do not fall within the predetermined allowable error range, it is impossible to determine which one of the remaining two sensor arrangements is reliable, so that control moves to the above-described step S116. At step S116, the optical axis control angle (swivel control angle) is set to its initial value. After completion of any one of steps S111, S113, S116, control moves to step S121 shown in FIG. 3. At step S121, the actuators 12L, 12R of the swivel lights 11L, 11R are driven based on the specified optical axis control angle (swivel control angle), and the present routine ends.

Thus, the automatic optical-axis adjusting device of the present embodiment includes a control parameter computing means embodied by the ECU 20 for computing the value of the turning radius (the control parameter), which is subsequently used for adjusting the direction of the optical axes of the swivel lights 11L, 11R, based on each one of the steering angle signal (output information of the steering angle sensor arrangement), the yaw rate signal (output information of the yaw rate sensor arrangement) and the left and right vehicle wheel speed signals (output information of the vehicle wheel speed sensor arrangement). The automatic optical-axis adjusting device also includes a sensor output judging means embodied by the ECU 20 for determining whether each value of the turning radius, which is used as the control parameter and is derived from the output information of a corresponding one of the sensor arrangements, is normal. The sensor output judging means first determines whether the majority of the computed values fall within the predetermined allowable error range. If the majority of the computed values fall within the predetermined allowable error range, the sensor output judging means determines the majority of the computed values as normal and the remaining of the computed values as abnormal. The automatic optical-axis adjusting device of the present embodiment further includes a control angle computing means embodied by the ECU 20 for computing the optical axis control angle (swivel control angle), which is used for adjusting the directions of the optical axes of the swivel lights 11L, 11R, based on the output information of the sensor arrangements, from which the normal value of the turning radius is derived. The automatic optical-axis adjusting device also includes an optical axis adjusting means embodied by the ECU 20 for adjusting the directions of the optical axes of the swivel lights 11L, 11R based on the optical axis control angle by driving the actuators 12L, 12R that turn the optical axes of the swivel lights 11L, 11R, respectively.

That is, the steering angle signal from the steering angle sensor 15, the yaw rate signal from the yaw rate sensor 16, and the left and right vehicle wheel speed signals from the left and right wheel speed sensors 18, 17 are inputted to the ECU 20 through the communication bus line 19 that acts as the external bus line. The value of the turning radius of the vehicle used for adjusting the directions of the optical axes of the swivel lights 11L, 11R is computed by the ECU 20 based on each one of the steering angle signal from the steering angle sensor 15, the yaw rate signal from the yaw rate sensor 16, and the vehicle wheel speed signals from the left and right wheel speed sensors 17, 18. When the majority of the computed values fall within the predetermined allowable error range, the majority of the computed values are determined as normal, and the remaining of the computed values is determined as abnormal. The sensor arrangement, from which the abnormal computed value is derived, is specified as abnormal. Also, the communication bus line 19 can be determined as abnormal when none of the output information from the sensor arrangements is obtained. The actuators 12L, 12R are driven to adjust the directions of the optical axes of the swivel lights 11L, 11R based on the optical axis control angle (swivel control angle) computed based on the output information of the sensor arrangements, from which the normal computed value is derived. Thus, it is possible to distinguish between the abnormality of the sensor arrangement and the abnormality of the communication bus line. Furthermore, the sensor failure specifying means outputs a sensor arrangement abnormal signal indicative of abnormality of a corresponding one of the sensor arrangements, from which the abnormal value of the control parameter is derived, allowing identification of the abnormal sensor arrangement. As a result, it is possible to take an appropriate countermeasure.

The control angle computing means embodied by the ECU 20 resets the optical axis control angle (swivel control angle) to the initial value when the majority of the values do not fall within the predetermined allowable error range. That is, when it is impossible to determine whether the computed values are normal, the optical axis control angle (swivel control angle) is reset to the initial value. Thus, the driver will not experience uncomfortable feeling upon the control operation of the optical axes of the swivel lights 11L, 11R.

In the above embodiment, the three sensor arrangements, i.e., the steering angle sensor arrangement, the yaw rate sensor arrangement, and the vehicle wheel speed sensor arrangement are used to compute the turning radius of the vehicle. However, the present invention is not limited to this. For example, the number of the sensor arrangements can be more than three. Furthermore, in order to obtain the turning radius of the vehicle, it is possible to use an image information processing operation carried out with use of a CCD camera, a forward information processing operation carried out with use of a laser radar system, a forward information processing operation carried out with use of a navigation system or any other appropriate operation.

Furthermore, in the above embodiment, the throttle valve position signal of the throttle valve position sensor 13 is used to determine whether the vehicle is in the running state or in the parking state. The present invention is not limited to this, and a signal of an accelerator pedal position sensor, a fuel injection control signal or any other appropriate signal can be used to determine whether the vehicle is in the running state. Also, these signals can be directly supplied to the ECU 20 without using the communication bus line 19.

Additional advantages and modifications will readily occur to those skilled in the art. The invention in its broader terms is therefore, not limited to the specific details, representative apparatus, and illustrative examples shown and described.

What is claimed is:

1. An automatic optical-axis adjusting device for automatically adjusting a direction of an optical axis of at least one front light of a vehicle, said automatic optical-axis adjusting device comprising:

a control parameter computing means for computing a value of a control parameter, which is used for adjusting said direction of said optical axis of said at least one front light, based on output information of each one of a plurality of sensor arrangements, wherein said plurality of sensor arrangements include a steering angle sensor arrangement, a yaw rate sensor arrangement and a vehicle wheel speed sensor arrangement that has left and right vehicle wheel speed sensors;

a sensor output judging means for determining whether each said value of said control parameter, which is derived from said output information of a corresponding one of said plurality of sensor arrangements, is normal, wherein:

said sensor output judging means first determines whether a majority of values of said control parameter fall within a predetermined allowable error range; and if said majority of said values fall within said predetermined allowable error range, said sensor output judging means determines said majority of said values as normal and the remaining of said values as abnormal;

a control angle computing means for computing an optical axis control angle, which is used for adjusting said direction of said optical axis of said at least one front light, based on said output information of at least one said sensor arrangement, from which said normal value of said control parameter is derived; and an optical axis adjusting means for adjusting said direction of said optical axis of said at least one front light based on said optical axis control angle by driving an actuator that turns said optical axis said at least one front light.

2. An automatic optical-axis adjusting device according to claim 1, wherein said control parameter computing means receives said output information of said each one of said plurality of said sensor arrangements through a communication bus line.

3. An automatic optical-axis adjusting device according to claim 2, further comprising a communication bus line failure specifying means that determines said communication bus line as abnormal and outputs a communication line abnormal signal indicative of abnormality of said communication bus line when none of said output information from said sensor arrangements is obtained.

4. An automatic optical-axis adjusting device according to claim 1, further comprising a sensor failure specifying means that outputs a sensor arrangement abnormal signal indicative of abnormality of a corresponding one of said sensor arrangements, from which said abnormal value of said control parameter is derived.

5. An automatic optical-axis adjusting device according to claim 1, wherein said control angle computing means resets said optical axis control angle to an initial value when said majority of said values do not fall within said predetermined allowable error range.

* * * * *